United States Patent
Hoke et al.

(10) Patent No.: US 9,045,043 B2
(45) Date of Patent: Jun. 2, 2015

(54) ZONAL VEHICLE GLASS HEATING STRATEGY

(71) Applicants: Paul Bryan Hoke, Plymouth, MI (US); Frank Fusco, Plymouth, MI (US)

(72) Inventors: Paul Bryan Hoke, Plymouth, MI (US); Frank Fusco, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 13/760,254

(22) Filed: Feb. 6, 2013

(65) Prior Publication Data

US 2014/0217080 A1 Aug. 7, 2014

(51) Int. Cl.
*B60L 1/02* (2006.01)
*B60H 1/00* (2006.01)
*E06B 7/00* (2006.01)

(52) U.S. Cl.
CPC .............. *B60L 1/02* (2013.01); *B60H 1/00785* (2013.01); *B60H 1/00864* (2013.01)

(58) Field of Classification Search
USPC .................. 219/202, 203, 522, 541; 52/171.2
See application file for complete search history.

(56) References Cited

U.S. PATENT DOCUMENTS

| 3,982,092 A * | 9/1976 | Marriott ........................ 219/203 |
| 4,673,797 A | 6/1987 | Weirick |
| 6,732,939 B1 | 5/2004 | Wang et al. |
| 8,084,716 B2 | 12/2011 | Day |

FOREIGN PATENT DOCUMENTS

EP 1112871 A1 7/2001

OTHER PUBLICATIONS

Windshield Fogging Prevention by Means of Mean Radiant Temperature Sensor; S. Mola, G. Lo Presti, M. Magini, N. Presutti, C. Malvicino; May 2, 2005; <http://www.all4engineers.com/freebook/a4e_ebooks/267-278_mola.pdf>.

* cited by examiner

*Primary Examiner* — Shawntina Fuqua
(74) *Attorney, Agent, or Firm* — Vichit Chea; Brooks Kushman P.C.

(57) ABSTRACT

A vehicle glass heating system may include a vehicle glass having two or more electrically heated zones. The system may also have a controller, which determines an output based on an input signal and selectively actuates at least a portion of the heated zones to heat the vehicle glass according to the output.

19 Claims, 6 Drawing Sheets

ZONAL VEHICLE GLASS HEATING STRATEGY

CROSS REFERENCE TO RELATED APPLICATION

This application is related to U.S. application Ser. No. 13/747,662, filed on Jan. 23, 2013, now U.S. Pat. No. 8,694,205, issued on Apr. 8, 2014, the contents of which are hereby incorporated by reference in its entirety.

BACKGROUND

Fogging, icing and misting may form on vehicle glass under certain environmental conditions. For example, ice may form on the exterior surface of vehicle glass when ambient temperature is below freezing. In addition, condensation may form on the inside surface of the glass when there is high relative humidity inside the vehicle and where the glass is cool due to a lower temperature outside the vehicle. Condensation may also form on the outside of the glass if cold air is blown onto the inside of the glass in an attempt to remediate a misting condition.

Existing vehicles may have a heating, ventilation and air-conditioning (HVAC) system that provides an airflow for clearing precipitation from the vehicle glass, preventing fog or ice from forming on the glass or providing a desired air temperature within the passenger cabin. To that end, the HVAC system may include a climate control head unit having controls that allow a user to operate the HVAC system by, for example, selecting a desired temperature. The HVAC system may further include a controller coupled to the climate control head unit to facilitate the configuration of additional settings, such as fan speed, air conditioning (A/C) compressor operation, and recirculation. Based on these settings, the controller may control a blower and the positioning of various air doors, in order to provide a flow of recirculated air or fresh air through an evaporator core or a heater core. In addition, existing HVAC systems may also have ductwork packaged in a vehicle in a way that may reduce or even prevent effective airflow along the perimeter of the vehicle glass, which may decrease the effectiveness of airflow-based defrosting or clearing of the glass along those portions. Furthermore, the airflow may be limited by other constraints, including vehicle styling, electronics packaging or features accessible to vehicle occupants, including a heads up display (HUD).

The HVAC system may further have an electronic automatic temperature control (EATC) module configured to automatically defrost the vehicle glass or adjust the level of heating and cooling in the vehicle, based on status signals received from sensors and controllers located throughout the vehicle. However, existing EATC modules and manual user inputs may have issues with the efficiency or effectiveness in keeping the windshield and other vehicle glass sufficiently clear.

SUMMARY

One embodiment of a vehicle glass heating system may include a vehicle glass having two or more electrically heated zones. The system may also have a controller, which determines an output based on an input signal and selectively actuates at least a portion of the heated zones to heat the vehicle glass according to the output.

Another embodiment of a vehicle glass heating system may include a vehicle glass having two or more electrically heated zones and an airflow device selectively providing a demist flow to the heated zones. This system may also have a controller, which determines an output based on one or more input signals and selectively actuates the airflow device and at least a portion of the heated zones to heat the vehicle glass according to the output.

A method for heating a vehicle glass may include the step of determining, by a controller based on comparing a fogging probability indicative of a fogging risk in a zone of a vehicle glass to a fogging risk threshold, a change in a demist flow and/or an electrical heating for the zone to reduce the fogging risk and/or reduce energy usage. The method may also include selectively providing an output to adjust the demist flow and/or the electrical heating to the zone of the vehicle glass when the change is warranted.

DETAILED DESCRIPTION

An HVAC system or airflow device may have a ductwork configuration including demist outlets that provide uneven demist flow across an entire vehicle glass. For example, the vehicle glass may be a windshield packaged in the vehicle, such that the A-pillars, header trim and dash panel impedes the demist flow along the perimeter of the windshield. In addition, demist flow may be impeded by other constraints, including vehicle styling, electronics packaging or features accessible to the occupants. Furthermore, precipitation may unevenly form across multiple zones of the vehicle glass due to certain environmental conditions. As one example, icing, fogging or misting may form more on one side of the vehicle than on another, due to differences in air humidity or temperature of the glass on different sides of the vehicle. These differences may be due to various conditions, such as uneven sun-load falling on different sides of the vehicle, increases in cabin humidity caused by occupant respiration, and increases in cabin temperature related to occupant body heat.

An improved vehicle glass heating system may implement a zonal glass heating strategy to address these and other conditions. The system may include a vehicle glass having two or more electrically heated zones and an HVAC system or airflow device selectively providing the demist flow to the heated zones. The system may also have a controller, which utilizes a fogging heuristic in conjunction with one or more input signals to determine a fogging probability and a related output. Based on the output, the controller may selectively actuate the airflow device and one or more heated zones to heat at least a portion of the vehicle glass or a combination of the vehicle glass and the passenger cabin. For example, the heating strategy may provide both the demist flow and electrically generated heat in one or more zones along the perimeter of a vehicle glass, if the fogging probability indicates that the fogging risk is higher in these zones. If the fogging risk in the zone is determined to exceed a threshold value, the heating strategy may determine a fogging probability and related output that requires an increase or continued supply of power to the heated zone and/or an increase or continued supply of the demist flow to the zone. If the fogging risk is determined to be below a threshold value, the heating strategy may determine a fogging probability and related output that requires a decrease or discontinued supply of power to the heated zone and/or a decrease or discontinued supply of the demist flow to the respective zone. By way of another example, demist flow may be biased more toward a driver side zone of a windshield over a passenger side zone of the windshield, if fogging risk is determined to be higher on the driver side than on the passenger side. By accounting for fogging probability, the improved heating strategy allows for the adjustment of demist flow and electrically generated heat when the controller determines that the fogging risk warrants it. Accordingly, the heating strategy may determine power supply for the electrically heated zones and/or a biased demist flow for the vehicle glass, to minimize energy utilization of the HVAC system.

In some examples, redirection of the demist/defrost airflow from a zone of the glass or passenger cabin having a lower probability of precipitation to a side or zone that has a relatively higher probability may be performed through the use of a multi-function duct. The multi-function duct may provide door actuation in various vehicle zones, thereby allowing doors to provide demist flow to certain zones to be closed off or throttled, and doors providing demist flow to other zones to be opened further to deliver more airflow where it is needed. The heating strategy may be further configured to adjust a blower speed to compensate for the opening and closing of doors providing demist flow. For example, if a demist flow is increased to a zone by the opening of a door of a multi-function duct, the blower speed may be increased to compensate for the redirected airflow.

Exemplary inputs received by the heating strategy to inform the fogging heuristic may include: vehicle sun-load, vehicle sun-load direction, vehicle occupancy (e.g., by way of seat or seatbelt sensors), cabin percent relative humidity, remote percent relative humidity, remote temperature, cabin temperature, ambient temperature, infrared glass temperature measurement, weather forecast for the current vehicle location, and current demist settings, as some examples. In some cases, the inputs to the HVAC controls strategy may include the use of one or more sensors that are already incorporated into the vehicle, such as existing humidity sensors, sun-load/direction sensors, rain sensors, wiper operation sensors, cabin temperature sensors, and ambient temperature sensors, among other available sources of information.

Figure 1A:
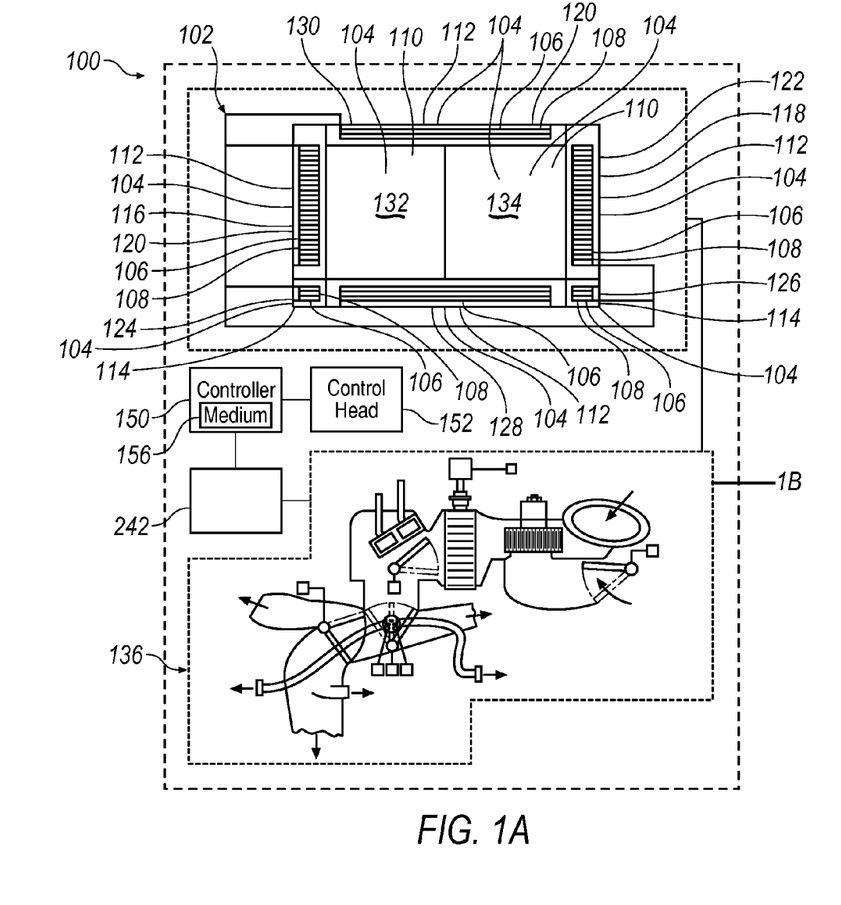
FIG. 1A illustrates an exemplary schematic view of a vehicle glass heating system for managing multiple zones of a vehicle glass and passenger cabin.

Referring to FIG. 1A, one embodiment of a vehicle glass heating system 100 includes a vehicle glass 102 having a plurality of electrically heated zones 104, each carrying one or more electric heating members 106, such as a resistive wire 108, a metallic coating 110, a positive temperature coefficient coating (PTC coating), metal impregnated with conductive polymers, other suitable electric heating member or any combination thereof. At least a portion of the heated zones may be adjacent to an edge portion 112 or a corner portion 114 of the glass. For example, the zones may include: a pair of opposing side zones 120, 122 disposed along a respective one of two edge portions 112 of the glass 102; a pair of corner zones 124, 126 disposed at a respective one of two corner portions 114 of the glass; a pair of vertically opposed zones 116, 118 disposed along a respective one of top and bottom edge portions 128, 130 of the vehicle glass; or any combination of the above. In addition, the electrically heated zones may include other portions of the glass, such as a driver-side zone 132 and a passenger-side zone 134, each spaced apart from the perimeter of the glass. Of course, the glass may have other suitable electrically heated zones, that carry independent electric heating members or shared electric heating members extending along two or more zones. These zones may be wired or electrically coupled in series or parallel to control power.

Figure 1B:
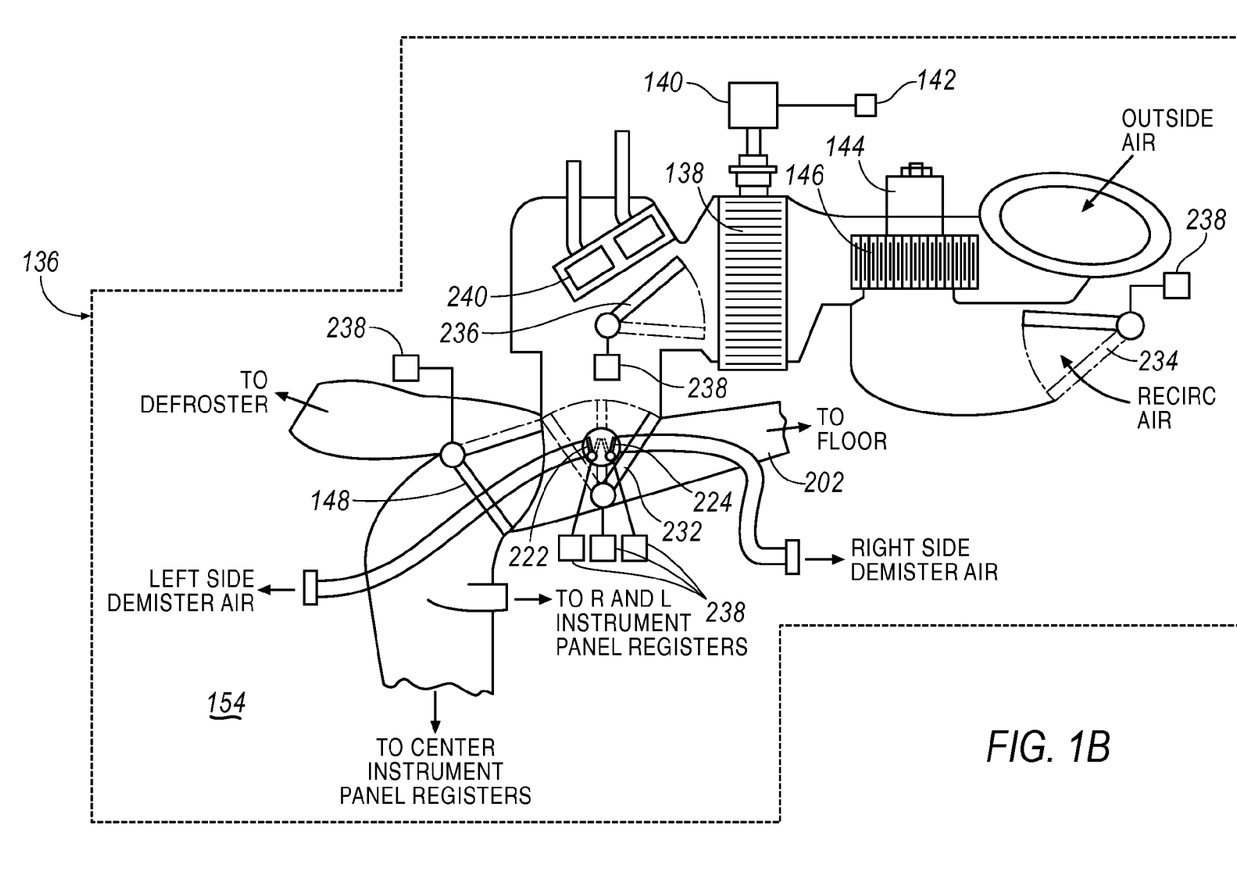
FIG. 1B illustrates an enlarged view of the system of FIG. 1A as taken from the outlined portion identified by reference numeral 1B.

As best shown in FIG. 1B, the system 100 may further include an airflow device 136 having air processing components including air heating components, such as a heater core 138. The air processing components may also include air conditioning (A/C) components, such as an evaporator core 140 and a compressor 142. In some instances, the compressor 142 may be electrically driven, while in other instances the compressor 142 may be mechanically driven by a vehicle engine. The system 100 may also include other A/C components, such as a low-pressure cycle switch 144 in communication with the compressor 142 operable to deactivate the compressor 142 under certain conditions, such as when the temperature of the evaporator core 140 drops below a predetermined value. This deactivation of the compressor 142 may be performed to aid in the prevention of freezing of the evaporator core 140 in cold conditions. The system 100 may also include fan components including, for example, a HVAC blower 146 and blower wheel 148 for generating airflow of the air being processed.

Figure 2A:
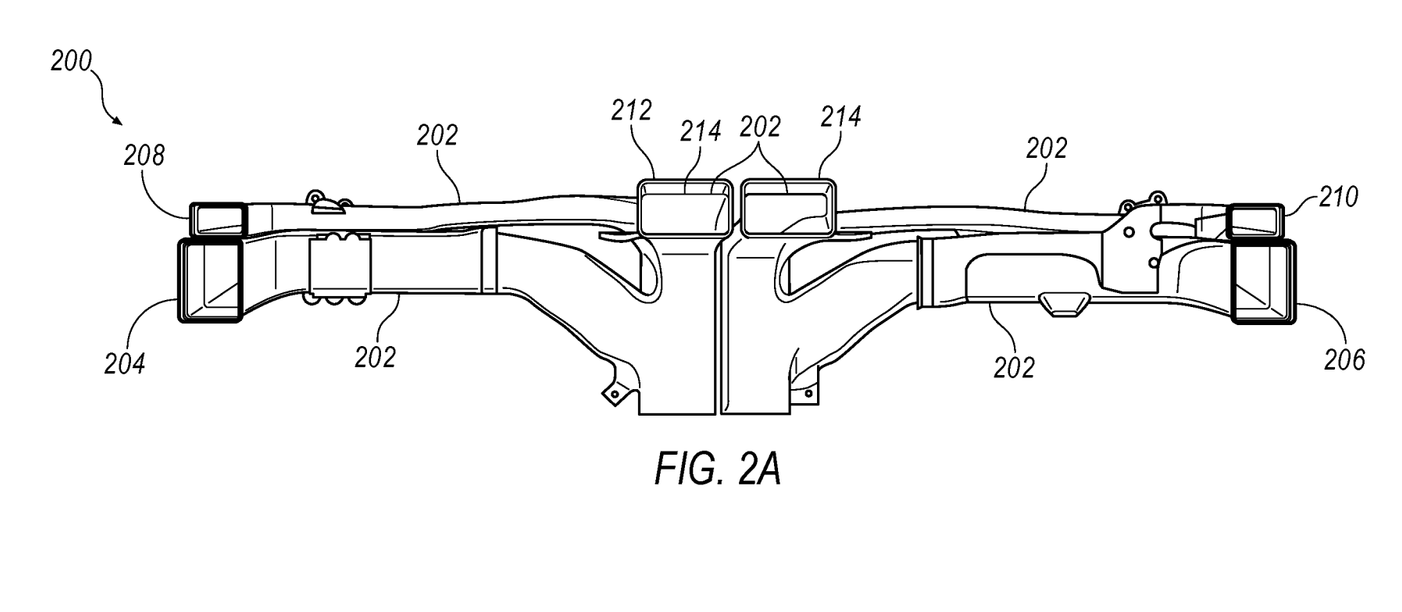
FIG. 2A illustrates an exemplary HVAC duct configuration of the system shown in FIG. 1.

Referring to FIG. 2A, the airflow device 136 may have an HVAC duct configuration 200 including a plurality of ducts 202 selectively providing demist flow to the heated zones 104 of the glass 102 and the passenger cabin 154. For example, the ducts may include laterally opposing demist outlets 204, 206 directed to a respective one of the side zones 116, 118. The ducts may further include a pair of corner demist outlets 208, 210 directed to a respective one of the two corner zones 124, 126. In addition, the ducts may also include a vertical demist outlets 212, 214, which are directed to a combination of the vertically opposed zones 128, 130, the driver-side zone 132 and the passenger-side zone 134. However, the duct may be directed to various combinations of the zones 104 of the glass. In addition, the ducts may have various suitable outlets directed toward the various portions of the passenger cabin.

Figure 2B:
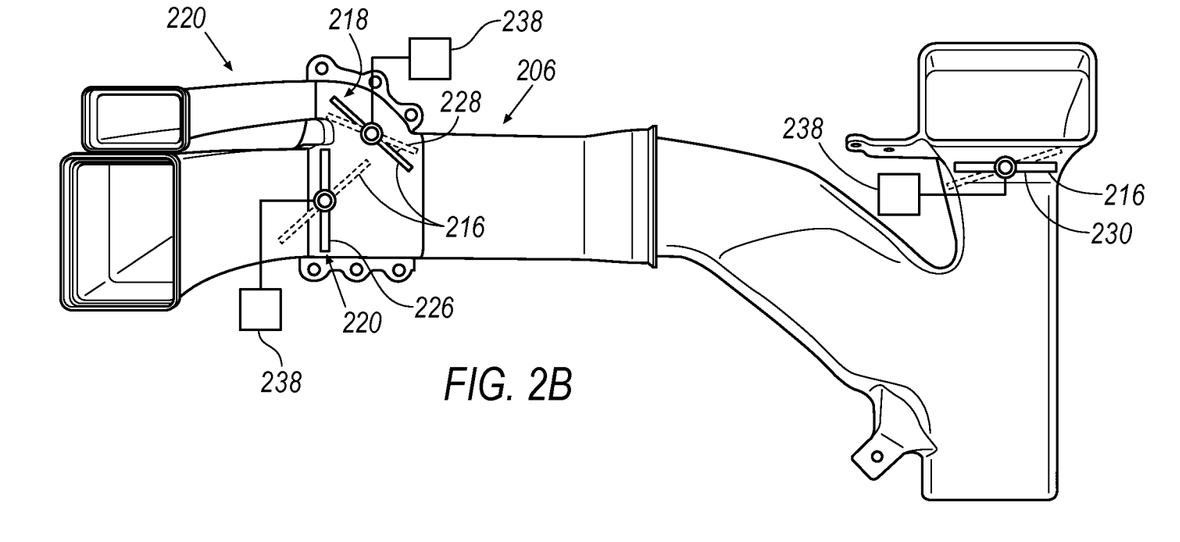
FIG. 2B illustrates an enlarged view of a driver-side portion of another exemplary HVAC duct configuration of the system shown in FIG. 1.

Referring to FIGS. 2A and 2B, the airflow device 136 may also have one or more doors 216, which are associated with the duct 200 and are movable between at least two positions to allow for the selective provisioning of different amounts of demist flow to the zones of the glass and passenger cabin. For example, as shown in FIG. 2B, the airflow device 136 may have a demist door 218 as one function of a portion of a multiple-function HVAC duct 200. The demist door 218 may be used to select an amount of airflow from the multiple-function HVAC duct 200 to be directed to an associated zone of the glass or passenger cabin via a demist duct 220, while the door 218 may be used to provide another amount of the airflow for other purposes. As shown in FIG. 1B, the duct may have an HVAC plenum including one or more demist doors 222, 224 to control demist flow to the various demist outlets. Referring again to FIG. 2B, each half of the duct configuration 200 may include dedicated demist ducts with doors 226, 228 and 230 for a respective one of the side zone, the corner zone and the combination of the vertically opposing zones and the associated driver-side zone or passenger-side zone. Accordingly, various exemplary HVAC duct configurations 200 may accomplish the aspects of the zonal vehicle glass heating strategy by including doors associated with demist outlets.

Referring again to FIG. 1B, the system 100 may further include other ducting with one or more doors to control flow from the multiple-function airflow duct to other portions of the vehicle. Specifically, to control the distribution of the demist flow through the ducts 202, the doors may include a panel-defrost door 232 facilitating the selective direction of airflow to multiple instrument panel demist vents, a floor-panel door 234 facilitating the selective direction of airflow to the floor vents, and an outside recirculated air door 236 facilitating the selection of passenger cabin air or outside air as input to the HVAC system. The system may include a temperature control blend door 240 to permit hot air mixing to obtain a desired target discharge air temperature to be exited from the system 100 into the passenger cabin 106. To facilitate the selective distribution of air, one or more of the aforementioned doors may be positioned as open, partially open, or closed. For example, in the HVAC duct 200, the demist door 218 may be used to selectively allow the demist flow into a dedicated demist duct 202 flowing directly from the HVAC plenum, where the amount of air to provide into the dedicated demist duct 202 may be determined by the controller.

The airflow device 136 may also have one or more actuators 238 coupled to the doors 216 for moving the doors to their positions. In some cases, the actuators may include vacuum motors that provide for positioning of the doors according to amount of vacuum, e.g., by using vacuum, partial vacuum and no vacuum positions. In some cases, the actuators may include an electric servo motor to facilitate the selective positioning of the doors.

Figure 3:
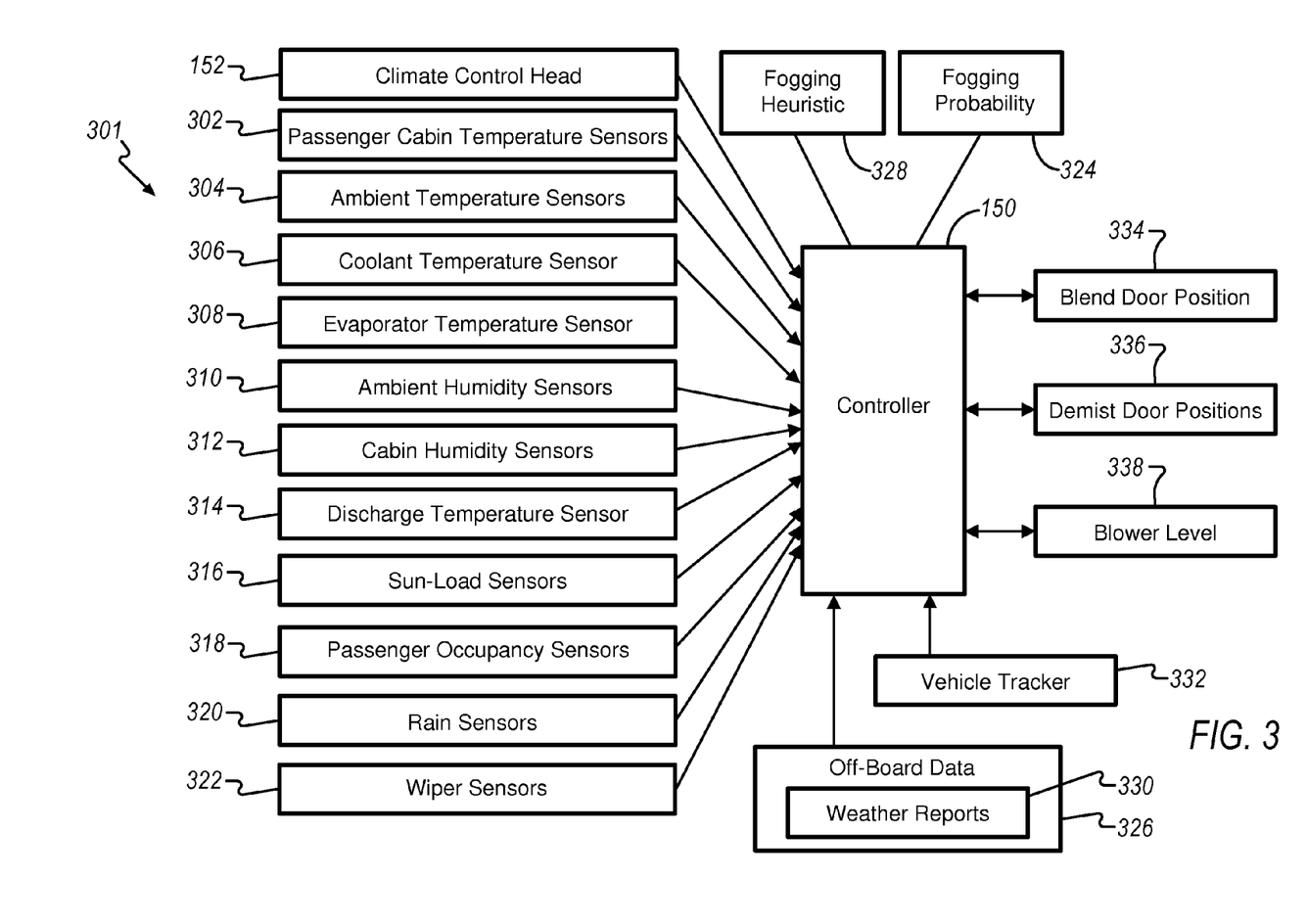
FIG. 3 illustrates an exemplary block diagram of a control system of the system shown in FIG. 1, for implementing a zonal vehicle glass heating strategy accounting for fogging risk.

Referring now to FIG. 3, the system 100 may further include one or more sensors 301 generating input signals based on a vehicle climate condition and/or user input. Examples of these sensors may include one or more passenger cabin temperature sensors 302 configured to provide information representative of interior cabin temperature, ambient temperature sensors 304 configured to provide information representative of ambient air temperature external to the vehicle, an engine coolant temperature sensor 306 configured to provide information representative of the engine coolant temperature for use in determining available heat (or for a vehicle having a heat pump heating system, another type of sensor such a cabin condenser temperature sensor), an evaporator temperature sensor 308 configured to provide information representative of the temperature of the evaporator core 140, one or more ambient humidity sensors 310 configured to provide information representative of the relative humidity of the exterior of the vehicle, one or more cabin humidity sensors 312 configured to provide information representative of the relative humidity of the passenger cabin, discharge air temperature sensors 314 configured to provide information representative of the discharge air temperature into the passenger cabin 102, sun-load sensors 316 configured to utilize photodiodes or other elements to provide information related to sun-loading and direction as it related to various zones of the vehicle, and passenger occupancy sensors 318 configured to provide information related to which seats of the vehicle are occupied. In addition, the sensors may also include one or more vehicle rain sensors 320 and one or more wiper operation sensors 322. The sensors may be located in various zones of the vehicle to facilitate the computation of fogging probabilities 324 for different zones of the glass and/or and/or passenger cabin. Moreover, the controller 150 may receive input signals from off-board data sources 326 to inform the fogging heuristic 328, such as a weather report 330 for an area local to the vehicle as determined by vehicle navigation information or data received from a phone, other mobile device or other vehicle tracker 332 on the vehicle. The controller may generate an actuation signal based on one or more input signals and transmit the actuation signal to the actuator for moving the door between its two or more positions.

Returning to FIG. 1, the system 100 may further include an EATC module, such as controller 150 having a climate control head 152. In particular, the climate control head 152 may be included as part of a vehicle instrument panel, and may be configured to allow a vehicle occupant to manually control the HVAC functions, and in some cases, override an automatic operation of the system 100. As some examples, the climate control head 152 may include controls such as: a mode selector configured to allow an occupant to choose where airflow will be directed by the panel-defrost door 232 and floor-panel door 234, a temperature selector configured to allow an occupant to select a preferred cabin air temperature, an A/C control to allow an occupant to manually select or deselect use of the compressor 142, a recirculation selector to allow for control of the recirculated air door 236 to select recirculation of cabin air, fresh air or some combination thereof, and a fan selector configured to allow an occupant to choose fan speed settings for the HVAC blower 146 and blower wheel 148.

The controller 150 may be configured to receive input signals from a vehicle occupant via the climate control head 152, and determine an output based the input signals. In addition, the controller may selectively actuate the airflow device 136 and one or more of the heated zones 104 to heat one or more zones of the vehicle glass or passenger cabin according to the output. In particular, the controller 150 may be configured to receive inputs from a vehicle occupant via the climate control head 152, which permits the vehicle occupants to select climate settings in the vehicle.

As best shown in FIG. 3, the controller 152 may also receive input signals from any one or more of the sensors, utilize a fogging heuristic 328 to determine a fogging probability 324. and determine related output based on the fogging probability. In particular, the controller 150 may receive input signals from a vehicle occupant via the climate control head 152 and other sensors to generate actuation signals to control various components of the system 100, such as electric heating and/or air heating components, air conditioning components, fan components, doors and other air distribution components. Based on the fogging probability 324, the controller 150 may be configured to algorithmically control climate control functions based on the fogging probability 324 to optimize demist flow to zones of the glass 102 and/or passenger cabin 154. For example, the controller 150 may be configured to provide an output 334 to control positioning of the temperature control blend door 242, an output 336 to control positioning of one or more demist doors, and an output 338 to control a fan component, such as the HVAC blower 146.

The controller 150 may be programmed with a zonal vehicle glass heating strategy utilizing the fogging heuristic 328 in conjunction with the user input signals and sensor input signals, to determine a fogging probability 324 indicative of a fogging risk for zones of the vehicle glass and/or passenger cabin. If the fogging risk in the zone is determined to exceed a threshold value, then the control strategy may be configured to increase or continue the supply of power to the electric heating member in the zone and/or increase or maintain the demist flow to the respective zone. If the fogging risk in the zone is determined to be below a threshold value, then the heating control strategy may be configured to decrease or discontinue the supply of power to the electric heating member in the zone and/or decrease or discontinue the demist flow to the respective zone. These thresholds may be the same in certain examples. In other examples, the thresholds for increasing and decreasing demist flow may differ to provide for a level of hysteresis to reduce oscillation between demist flow levels.

The controller 150 may compute fogging probabilities 324 for multiple zones in relation to one another, rather than independently computing a fogging probability 324 relative to a predetermined threshold for a first zone and a second fogging probability 324 relative to a predetermined threshold for a second zone. For instance, the controller 150 may determine fogging probability 324 for driver and passenger zones of a windshield in relation to one or more of the zones along the perimeter of the windshield. To do so, the controller 150 may process one or more of input signals indicative of temperature and humidity of, for example, the side zones of the vehicle glass in comparison to the corner zones of the glass. Of course, the controller may process various other input signals, such as occupancy of the passenger seat, sun-load of the driver side as compared to the sun-load of the passenger side, and current demist settings, such as an output to adjust a left demist door, an output to adjust a right demist door, and an output to adjust a defrost nozzle. By considering multiple zones in relation to one another, the controller 150 may compute fogging probabilities 324 based on fogging risks of a zone in consideration of fogging risks of adjacent zones.

As one example, the controller 150 may receive various input signals and determine that the entire vehicle glass is covered with icing based on input signals received at, for example, cold engine startup. Based on these input signals, the controller may determine an output requiring operation of a blower at full speed, operation of the heater evaporator core to provide maximum heat and movement of the doors to direct airflow to both the driver-side portion and passenger side portion of the glass. Also in this example, the controller may then sequentially actuate the electrically heated zones. For example, based on the output, the controller may actuate the laterally opposing zones 116, 118 until the associated input signals indicate that those zones have been cleared of fog or frost. The controller may then actuate the corner zones 124, 126 until the associated input signals indicate that those portions have been cleared. The controller may then actuate the vertically opposing zones 128, 130 until the input signals indicate those portions have been cleared. This sequence may reduce the fogging risk for the associated zones and decrease or at least efficiently manage the total energy usage of the system according to, for example, an order of priority for a driver's lines of sight. By way of another example, the controller 150 may actuate all of the zones in unison depending on various inputs, such as vehicle alternator capacity or battery state of charge. Of course, the controller may be programmed to determine output for actuating the zones in any suitable order by utilizing any components of the system.

Figure 4:
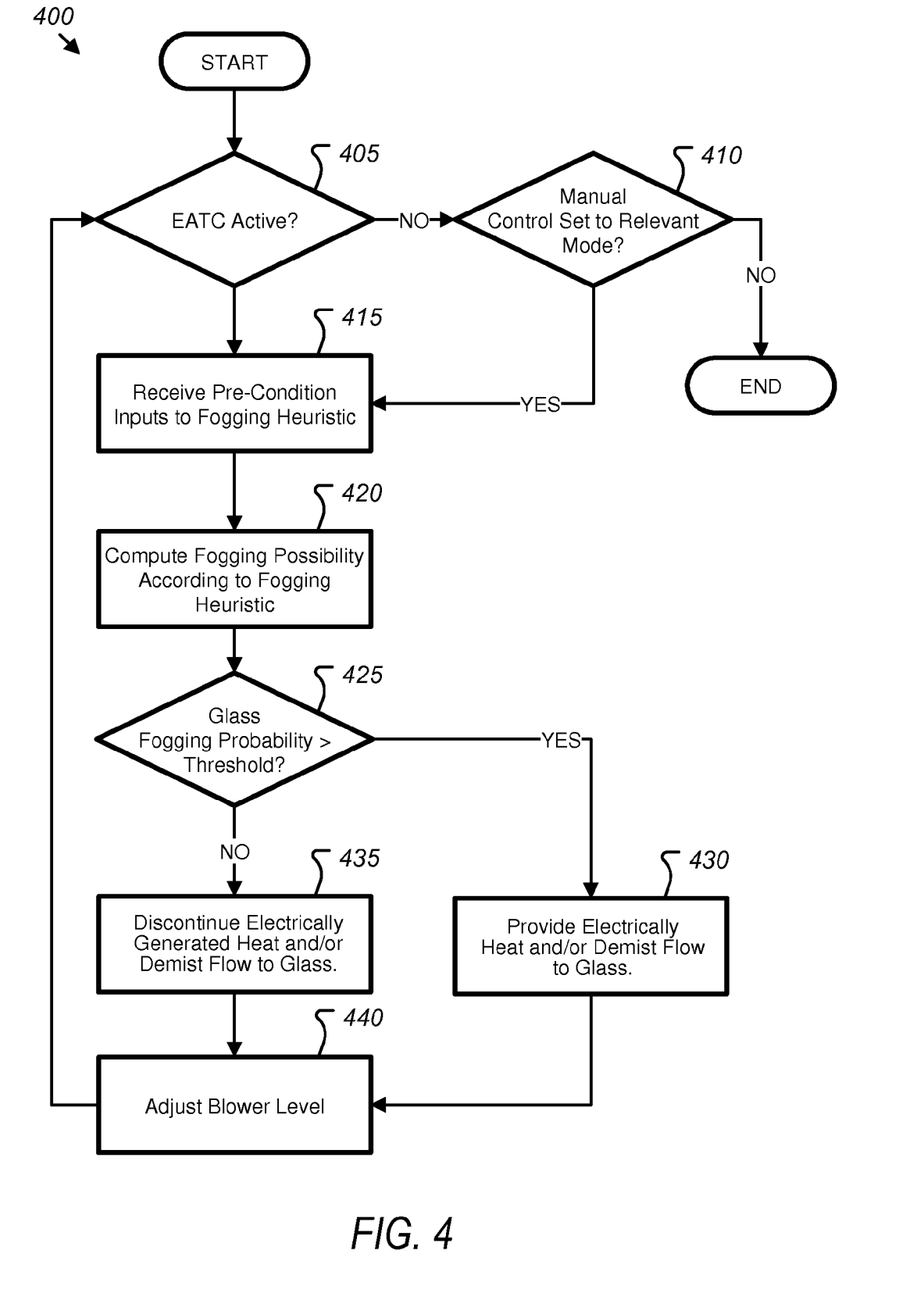
FIG. 4 is a flowchart depicting control logic for the system shown in FIG. 1.

FIG. 4 illustrates an exemplary process 400 for implementing the system 100 to provide heat to the vehicle glass and/or cabin, while accounting for fogging risk. The process 400 may be performed by various devices, such as by controller 150 utilizing the fogging heuristic 328 in combination with the components of the HVAC system 100 and the multiple-function HVAC duct 200. By utilizing the fogging heuristic 328, the heating control strategy may improve the handling of fogging, icing and misting conditions for various zones of the vehicle glass, while at the same time serving to minimize energy utilization of the HVAC system.

In block 405, the controller 150 may determine whether electronic automatic temperature control is active. For example, the controller 150 may determine that electronic automatic temperature control is active according to input signals received from the climate control head 152 of the HVAC system. If electronic automatic temperature control is determined to be active, control passes to block 415. Otherwise, control passes to block 410.

In block 410, the controller 150 may determine whether the user operated the control head 152 to select demist flow for certain vents or demist outlets. For example, even if electronic automatic temperature control is inactive, certain manual air flow settings may benefit from utilizing the fogging heuristic 328. In this respect, the controller 150 may receive input signals from the climate control head 152 and initially determine whether flow has been selected for delivery to vents or demist outlets that involve the fogging heuristic 328. If the manual air flow settings may benefit from utilization of the fogging heuristic 328, control passes to block 415. Otherwise the process 400 ends.

In block 415, the controller 150 may receive pre-condition input signals to inform the fogging heuristic 328. Exemplary sensor inputs to the controller 150 may include one or more of sensor inputs discussed in detail above. Because current settings may affect fogging probability 324, the controller 150 may further utilize current demist flow settings for the zone or for other zones in the vehicle as an input signal to the fogging heuristic 328.

In block 420, the controller 150 may compute or otherwise calculate the fogging probability 324. Based on the user input signals and sensor input signals, the controller 150 may compute the fogging probability 324, which is directed to an electrically heated zone of the glass and/or a zone of the passenger cabin and indicative of a likelihood of fogging risk for those zones. The controller 150 may then compute the fogging probability 324 for additional zones of a vehicle. For instance, the controller 150 may compute a first fogging probability 324 for a first zone, such as the side zones of the glass, and also a second fogging probability 324 for a second zone, such as the corner zones of the glass.

In block 425, the controller 150 may compare the determined fogging probability 324 to a fogging risk threshold to determine an output. The fogging risk threshold may be used to determine the output indicative of the amount of power to be supplied to the electrically heated zone and/or the amount of demist flow selectively provided to the associated zone. For example, if the determined fogging probability 324 exceeds or otherwise triggers the fogging risk threshold, the controller 150 may determine an output to increase power or continue to provide power to the zone and/or provide or continue to provide demist flow to one of the first and second zones. In the alternative, if the determined fogging probability 324 fails to exceed or trigger the fogging risk threshold, the controller 150 may determine an output to decrease power or continue not providing power to the electrically heated zone and/or discontinue or continue to not provide demist flow to the associated zone. In this respect, the controller 150 may compute a fogging probability 324 for multiple zones of the vehicle relative to each other, then each fogging probability 324 may be compared to a fogging risk threshold. These fogging risk thresholds may differ based on the different zones. In addition, the controller may determine fogging probability for each zone independently of each other, based on respective thresholds for each zone. For example, higher priority zones of the glass or passenger cabin may utilize lower thresholds for the provisioning of additional electrically generated heat and/or demist flow.

Furthermore, the controller may include logic indicative of an order of priority to sequentially actuate and clear the laterally opposing zones, the corner zones, and the vertically opposing zones of the glass. However, the priority of zones and order of actuating those zones may have various other suitable orders. If electrically generated heat and/or demist flow is to be maintained or increased to the zone, control passes to block 430. Otherwise, control passes to block 435.

In block 430, the controller 150 may increase or continue to provide electrically generated heat and/or demist flow to the zone. As another example, the demist door 218 may be one function of a multiple-function HVAC duct 200, and may be used to select an amount of airflow from the multiple-function HVAC duct 200 to be directed to an associated vehicle zone via demist duct 220. To maintain demist flow to the zone, the controller 150 may provide an output to open the demist door 218 to selectively provide airflow to at least one demist outlet in the zone of the vehicle.

In block 435, the controller 150 may decrease or discontinue electrically generated heat and/or demist flow to the vehicle zone. Continuing with the exemplary multiple-function HVAC duct 200, to stop maintaining demist flow to the vehicle zone, the controller 150 may provide an output to close the demist door 218 to selectively close off airflow to the at least one demist outlet in the zone of the vehicle.

In block 440, the controller 150 may provide an output to the HVAC blower 146 to compensate for any changes to open outlets and fogging probability. Still continuing with the exemplary multiple-function HVAC duct 200, if the controller 150 increased the opening of the demist door 218, then the controller 150 may command the HVAC blower 146 to provide additional output to account for the airflow being diverted from the multiple-function HVAC duct 200 for use in providing demist flow to the associated zone, thereby preserving the amount of airflow utilized for other purposes. In the alternative, if the controller 150 reduced the opening of the demist door 218, the controller 150 may command the HVAC blower 146 to provide reduced output to account for the airflow no longer being diverted from the multiple-function HVAC duct 200, thereby preventing an increase in the amount of airflow utilized for other purposes.

After block 440 the process 400 may return to block 405. While the process 400 is described with respect to a multiple-function HVAC duct 200, other types of ducting are similarly applicable. For example, the system may have other suitable dedicated demist ducts flowing directly from the HVAC plenum, individual demist doors located within the HVAC plenum to control airflow to various other demist outlets, and doors associated with demist outlets in different zones of the passenger cabin 102 to selectively provide demist flow to the zone.

The system may include a computer-readable medium 156 coupled to the controller 150 and including computer-executable instructions executable by the controller or other processors. Computer-executable instructions may be compiled or interpreted from computer programs created using a variety of programming languages and/or technologies, including, without limitation, and either alone or in combination, JAVA, C, C++, VISUAL BASIC, JAVA SCRIPT, PERL, etc. In general, a processor or microprocessor receives instructions, e.g., from the medium 156 or other memory, and executes the instructions to perform one or more processes, including one or more of the processes described herein. Such instructions and other data may be stored and transmitted using a variety of computer-readable media.

The computer-readable medium 156 (also referred to as a processor-readable medium) includes any non-transitory (e.g., tangible) medium that participates in providing data, such as instructions, that may be read by a computer (e.g., by a processor of a computing device). In particular, the computer readable medium may store a reference lookup table including instructions in the form of a plurality of actuation signals for a plurality of corresponding reference input signals. The controller may access the reference lookup table and compare the input signal to the reference input signals to determine the first and second actuation signals indicative of the aforementioned output. The computer readable medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. An application configured to perform the operations of the controller 150, such as the fogging heuristic 328, may be one such computer program product and may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
    a vehicle glass having a plurality of electrically heated zones, wherein the heated zones includes a pair of laterally opposing side zones disposed along a pair of opposing side edge portions of the vehicle glass, a pair of corner zones disposed at a pair of corner portions of the vehicle glass, and a pair of vertically opposing zones disposed along a respective one of top and bottom edge portions of the vehicle glass; and
    a controller determining an output based on an input signal and selectively actuating at least a portion of the heated zones to heat the vehicle glass according to the output.

2. The system of claim 1, wherein the controller sequentially actuates the heated zones according to the output.

3. The system of claim 1, wherein the controller in a first step actuates a pair of heating members carried by the pair of opposing side portions of the vehicle glass.

4. The system of claim 1, wherein the controller in a second step actuates a pair of heating members carried by the pair of corner portions of the vehicle glass.

5. The system of claim 1, wherein the controller in a third step actuates a pair of heating members carried by a respective one of the top edge portion and the bottom edge portion of the vehicle glass.

6. A system, comprising:
    a vehicle glass having a plurality of electrically heated zones; and
    an airflow device selectively providing a demist flow to the plurality of heated zones; and
        a controller determining an output based on at least one input signal and selectively actuating the airflow device and at least a portion of the heated zones to heat the vehicle glass according to the output.

7. The system of claim 6, wherein the at least a portion of the heated zones is adjacent to an edge portion and a corner portion of the vehicle glass.

8. The system of claim 6, wherein the heated zones includes at least one of:
    a vertically opposed zones disposed along top and bottom edge portions of the vehicle glass;
    a pair of corner zones disposed at a pair of corner portions of the vehicle glass; and
    a pair of opposing side zones disposed along a pair of opposing side edge portions of the vehicle glass.

9. The system of claim 6, wherein each of the plurality of heated zones carries at least one electric heating member.

10. The system of claim 9, wherein the electric heating member is at least one of a resistive wire and a metallic coating.

11. The system of claim 6, wherein the controller determines a maximum blower setting is warranted based on the at least one input signal, actuates a blower of the airflow device to operate at a maximum speed and sequentially actuates the heated zones.

12. The system of claim 11, wherein the controller sequentially actuates the heated zones.

13. The system of claim 11, wherein the heated zones include at least one of:
    a pair of laterally opposing side zones disposed along a pair of opposing side edge portions of the vehicle glass;
    a pair of corner zones disposed at a pair of corner portions of the vehicle glass; and
    a pair of vertically opposing zones disposed along a respective one of top and bottom edge portions of the vehicle glass;
    wherein the controller sequentially actuates the pair of laterally opposing side zones, the pair of corner zones and the pair of vertically opposing zones.

14. The system of claim 6, wherein the airflow device includes:
    a plurality of ducts directed to the heated zones;
    at least one door movable between at least two positions for directing the demist flow through at least a portion of the plurality of ducts; and
    at least one actuator coupled to the at least one door for moving the at least one door between the at least two positions;
    wherein the controller generates an actuation signal based on the at least one input signal and transmits the actuation signal to the at least one actuator for moving the at least one door between the at least two positions.

15. The system of claim 14, wherein the at least one door directly controls at least one of an airflow from a multiple-function airflow duct, an airflow to a dedicated demist duct, and an airflow through an airflow plenum to control airflow volume.

16. The system of claim 6, wherein the controller actuates the heated zone to at least one of reduce the fogging risk for the heated zone and reduce a total energy usage by the heated zone and the airflow device.

17. The system of claim 6, further comprising:
    a computer readable medium storing a reference lookup table including a plurality of actuation signals for a plurality of corresponding reference input signals;
    wherein the controller accesses the reference lookup table and determines the first and second actuation signals from the plurality of actuation signals, based on referencing the at least one input signal with the plurality of corresponding reference input signals.

18. The system of claim 6, wherein the at least one input signal is generated by at least one of a human machine interface, a sun-load sensor, an ambient temperature sensor, an ambient relative humidity sensor, a cabin temperature sensor, a cabin relative humidity sensor, a vehicle tracking sensor, a received weather report, a rain sensor, a wiper operation sensor, an engine coolant temperature sensor and a discharge temperature sensor detecting a demist flow temperature discharged from the airflow device.

19. A method, comprising:
    determining, by a controller based on comparing a fogging probability indicative of a fogging risk in a zone of a vehicle glass to a fogging risk threshold, a change in at least one of a demist flow and an electrical heating for the zone to at least one of reduce the fogging risk and reduce energy usage; and selectively providing an output to adjust at least one of the demist flow and the electrical heating to the zone of the vehicle glass when the change is warranted.

\* \* \* \* \*